US008390444B2

(12) United States Patent
Li et al.

(10) Patent No.: US 8,390,444 B2
(45) Date of Patent: Mar. 5, 2013

(54) SENSOR-LOCATION SYSTEM FOR LOCATING A SENSOR IN A TRACT COVERED BY AN EARTH-BASED SENSOR NETWORK

(75) Inventors: Zhiyong Li, Redwood City, CA (US); Peter G. Hartwell, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 453 days.

(21) Appl. No.: 12/770,941

(22) Filed: Apr. 30, 2010

(65) Prior Publication Data
US 2011/0267171 A1 Nov. 3, 2011

(51) Int. Cl.
*G08B 1/08* (2006.01)
(52) U.S. Cl. .............. 340/539.22; 340/531; 340/539.1; 340/539.26; 342/357.25; 356/4.01; 356/5.01; 702/5; 250/336.1
(58) Field of Classification Search ............. 340/539.22, 340/539.26, 531, 539.1; 342/357.25; 356/4.01, 356/5.01; 702/5; 250/336.1
See application file for complete search history.

(56) References Cited

U.S. PATENT DOCUMENTS

| 4,633,263 | A | | 12/1986 | Altshuler |
| 4,654,528 | A | * | 3/1987 | Cloud et al. ............... 250/336.1 |
| 4,771,292 | A | | 9/1988 | Beach et al. |
| 5,065,163 | A | | 11/1991 | Mears |
| 6,195,039 | B1 | | 2/2001 | Glass, Jr. |
| 6,230,566 | B1 | * | 5/2001 | Lee et al. ..................... 73/514.32 |
| 6,480,115 | B2 | * | 11/2002 | Ghahramani ............... 340/815.4 |
| 6,628,941 | B2 | | 9/2003 | Knoblach et al. |
| 7,277,414 | B2 | | 10/2007 | Younis et al. |
| 7,362,270 | B2 | | 4/2008 | Srinivasan et al. |
| 7,363,157 | B1 | | 4/2008 | Hanna et al. |
| 7,562,821 | B2 | | 7/2009 | Seko et al. |
| 8,031,068 | B1 | * | 10/2011 | Steadman et al. ........ 340/539.22 |
| 2002/0089304 | A1 | * | 7/2002 | Lew ............................. 320/107 |
| 2003/0218540 | A1 | * | 11/2003 | Cooper et al. ........... 340/539.26 |
| 2007/0080863 | A1 | * | 4/2007 | Glockler et al. .............. 342/463 |
| 2007/0171042 | A1 | * | 7/2007 | Metes et al. .................. 340/521 |
| 2008/0246679 | A1 | * | 10/2008 | Martek et al. ................ 343/793 |
| 2009/0030647 | A1 | | 1/2009 | Stocker |

(Continued)

FOREIGN PATENT DOCUMENTS

| CN | 1570668 | 1/2005 |
| CN | 201133936 | 10/2008 |

(Continued)

OTHER PUBLICATIONS

Stoleru, Radu et al., "A High-Accuracy, Low-Cost Localization System for Wireless Sensor Networks", *SenSys '05*, , San Diego, California, USA Copyright 2005 ACM, (Nov. 2, 2005),p. 13-26.

(Continued)

*Primary Examiner* — Jennifer Mehmood
*Assistant Examiner* — Andrew Bee (57) ABSTRACT

A sensor-location system for locating sensors in a tract covered by an earth-based sensor network. The sensor-location system includes at least one sensor-identification device, and at least one sensor locator. The sensor-identification device is affixed to a respective sensor in the earth-based sensor network. The sensor locator is configured for use from on board of an aircraft. In addition, the sensor locator is configured to acquire geographic-location data of said sensor including an identifying signature from the sensor-identification device of the sensor in the tract covered by the earth-based sensor network.

12 Claims, 6 Drawing Sheets

U.S. PATENT DOCUMENTS

| | | | | |
|---|---|---|---|---|
| 2009/0310867 A1* | 12/2009 | Matei et al. | | 382/195 |
| 2010/0066537 A1* | 3/2010 | Weller et al. | | 340/565 |
| 2010/0085581 A1 | 4/2010 | Barbier et al. | | |
| 2010/0250482 A1* | 9/2010 | Ma | | 706/54 |

FOREIGN PATENT DOCUMENTS

| | | |
|---|---|---|
| KR | 20000054068 | 9/2000 |
| TW | 2007/28759 | 8/2007 |
| WO | WO-95/04407 | 2/1995 |
| WO | WO-96/13875 | 5/1996 |
| WO | WO-03/015452 | 2/2003 |
| WO | WO-03/015452 A3 | 2/2003 |
| WO | WO-2007043908 | 4/2007 |
| WO | WO-2010026524 | 3/2010 |

OTHER PUBLICATIONS

Szewczyk, Robert et al., "Lessons From a Sensor Network Expedition", *Lecture Notes in Computer Science*, vol. 2920., (2004), 16 pgs.

Toth, Charles et al., "Terrain-Based Navigation: Trajectory Recovery from LiDAR Data", *IEEE Xplore*, (2008), p. 760-765.

Lorenz, Ralph D., "A Review of Balloon Concepts for Titan" *JBIS*, vol. 61, (2008), 12 pgs.

Chu, Hung-Chi et al., "A GPS-Less Self-Positioning Method for Sensor Networks", *Proceedings of the 2005 11th International Conference on Parallel and Distributed Systems (ICPADS'05)*, vol. 2, (Jul. 20-22, 2005), pp. 629-633.

* cited by examiner

SENSOR-LOCATION SYSTEM FOR LOCATING A SENSOR IN A TRACT COVERED BY AN EARTH-BASED SENSOR NETWORK

TECHNICAL FIELD

Embodiments of the present invention relate generally to a sensor-location system for locating sensors in a tract covered by an earth-based sensor network, a sensor-network-monitoring system, and a method for locating sensors in a tract covered by an earth-based sensor network.

BACKGROUND

As the demand for resources increases with the growth of human populations, interest in developing new methodologies for the discovery and exploitation of these resources continues to grow. For example, with the emergence of increasing demand for petroleum products from rapidly developing countries, the impetus to find new reserves of oil has taken a pre-eminent role in the global economy. Moreover, increasing global populations have placed greater demands on securing the borders of countries in proximity to large populations displaced by economic stressors affecting their less fortunate neighbors. In addition, the growth of human populations along with increasing polarizations within such populations has raised the specter of terrorist assaults affecting domestic tranquility within sovereign territories. All the above suggest applications that may profit from methodologies for monitoring large tracts of land with sensor networks.

Thus, scientists are engaged in developing new methodologies for the monitoring of diverse sensor networks deployed on the surface of the earth, whether those sensors are directed towards the discovery of new mineral resources, or towards the defense of countries from emerging threats to their security.

DESCRIPTION OF THE DRAWINGS

The accompanying drawings, which are incorporated in and form a part of this specification, illustrate embodiments of the invention and, together with the description, serve to explain the embodiments of the invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Embodiments of the present invention include a sensor-location system for locating sensors in a tract covered by an earth-based sensor network. The sensor-location system includes at least one sensor-identification device, and at least one sensor locator. The sensor-identification device is affixed to a respective sensor in the earth-based sensor network. The sensor locator is configured for use from on board of an aircraft. In addition, the sensor locator is configured to acquire geographic-location data of the sensor including an identifying signature from the sensor-identification device of the sensor in the tract covered by the earth-based sensor network.

Figure 1:
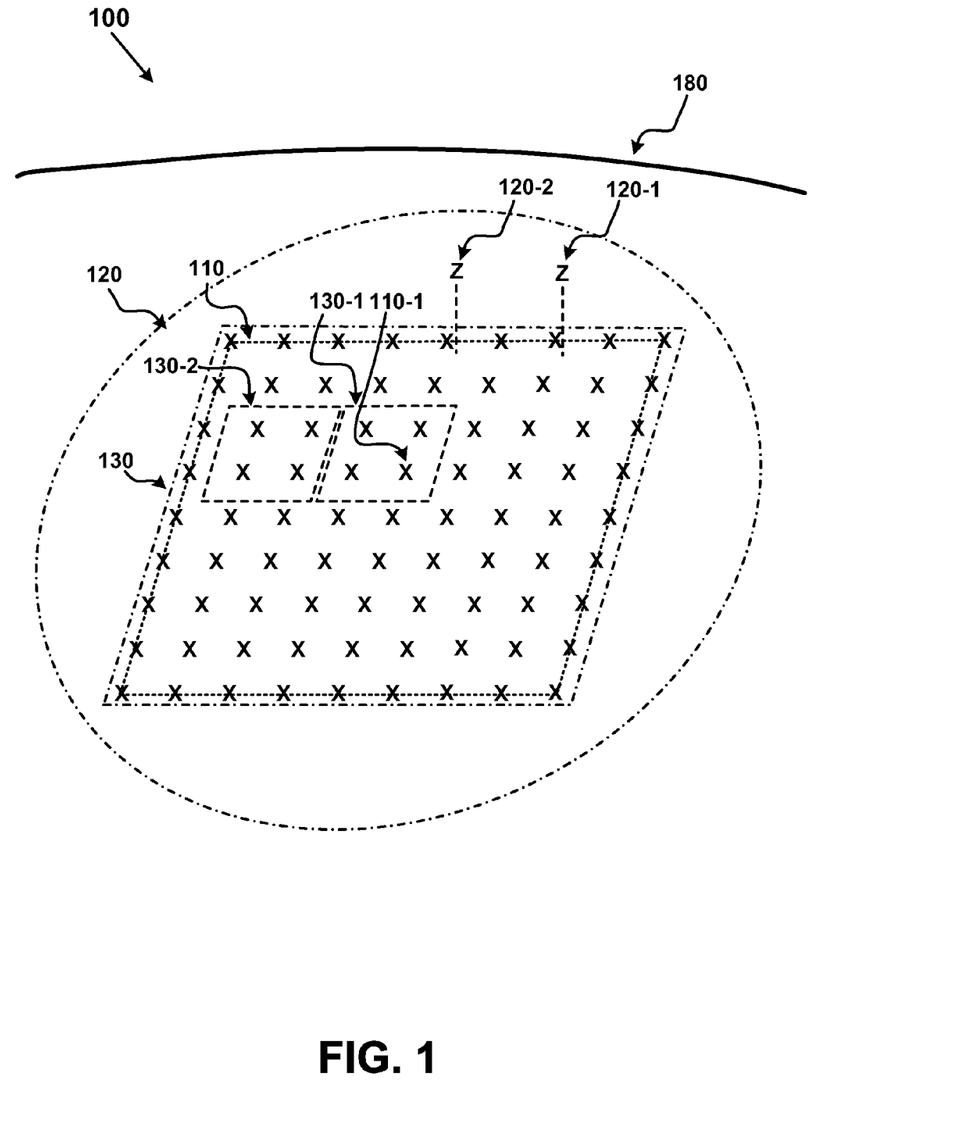
FIG. 1 is a perspective view of geographic locations of: a tract covered by an earth-based sensor network, regions of interest in the tract, sensors in the earth-based sensor network, and a sensor locator on board of an aircraft for locating sensors in the tract covered by the earth-based sensor network, in accordance with embodiments of the present invention.
Figure 2:
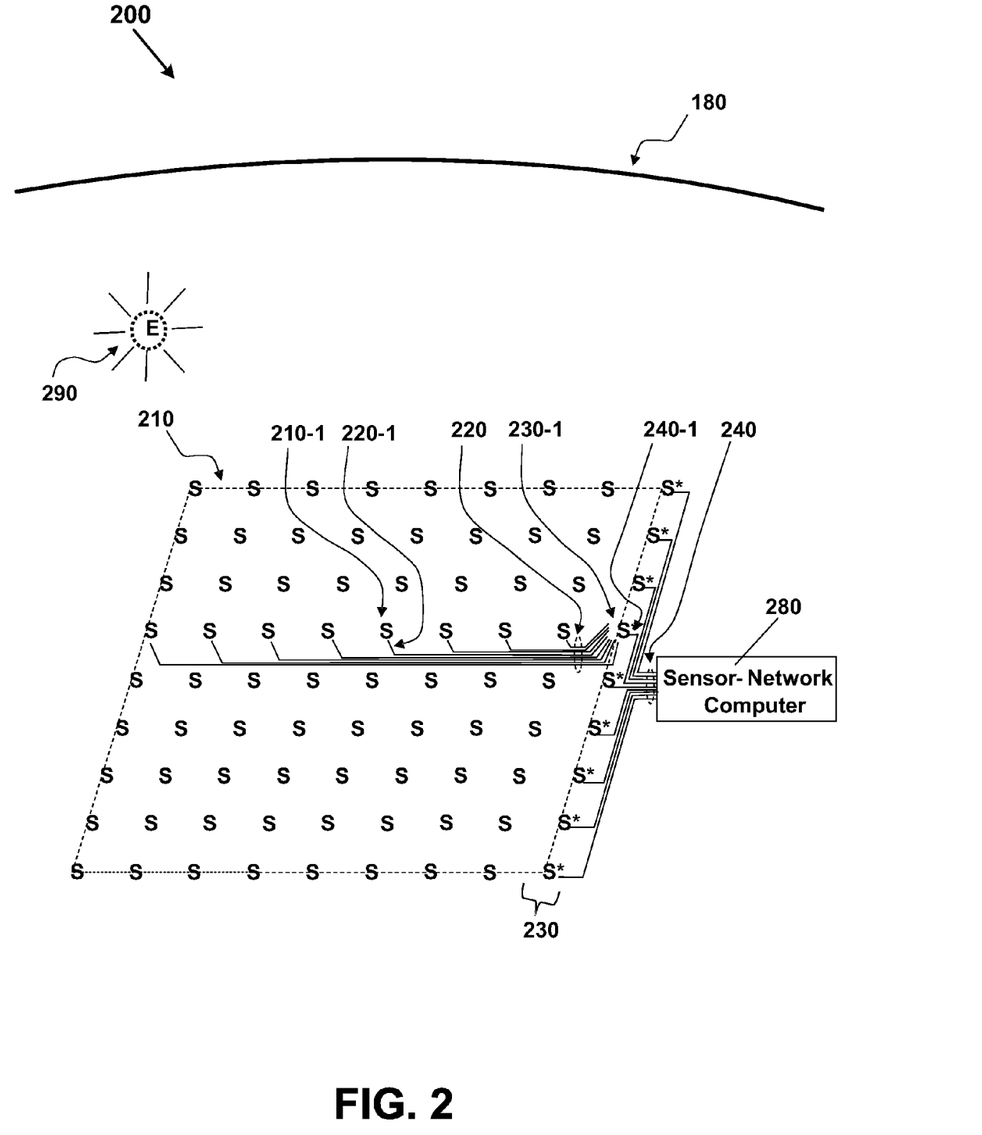
FIG. 2 is a perspective view of the earth-based sensor network in a sensor-network-monitoring system showing sensors transmitting signals, resulting from the occurrence of an event, to a sensor-network computer through a super-node in the earth-based sensor network, in accordance with embodiments of the present invention.
Figure 3:
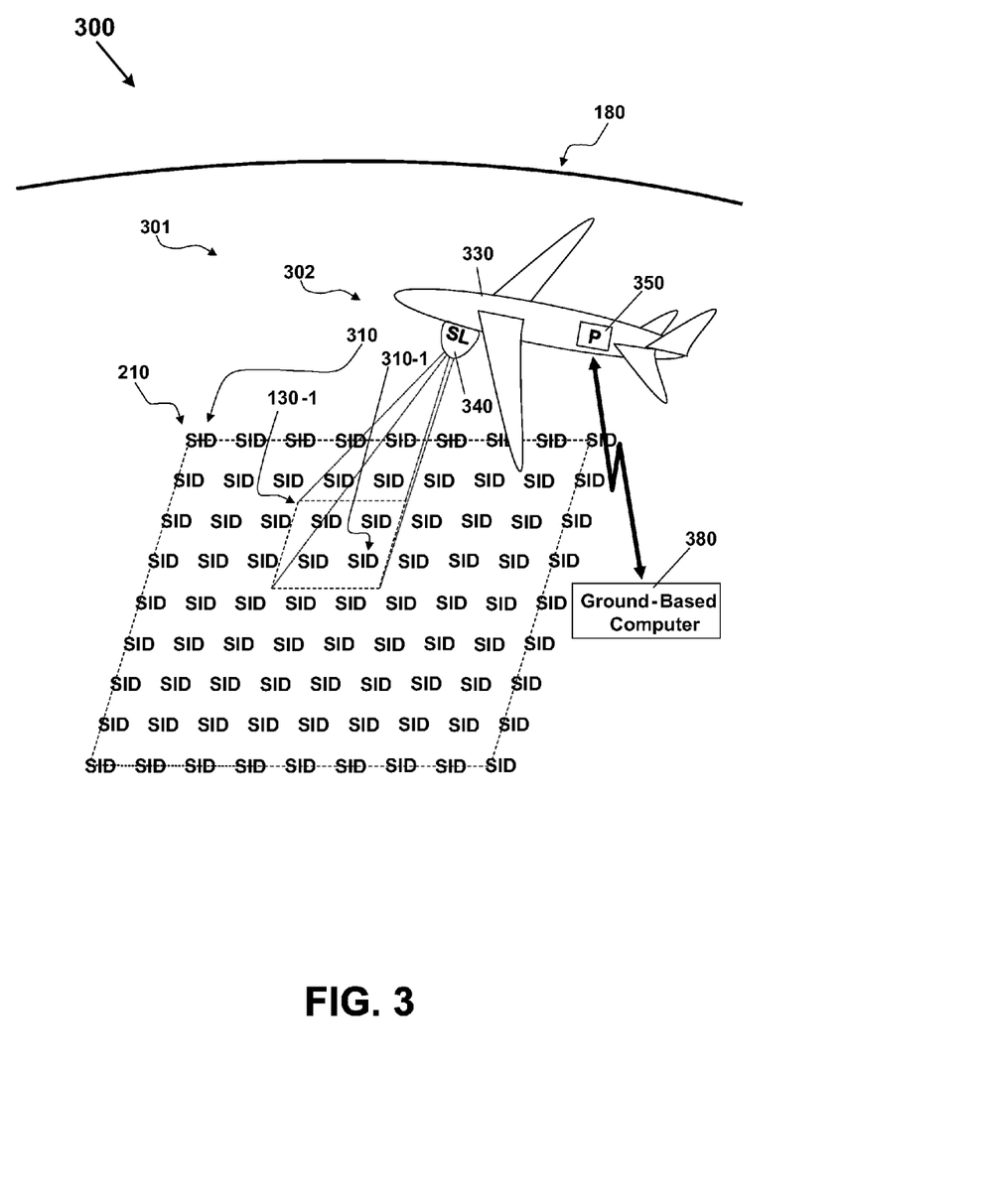
FIG. 3 is a perspective view of a sensor-network-monitoring system including the earth-based sensor network of FIG. 2, and a sensor-location system for locating sensors in the tract of FIG. 1 covered by the earth-based sensor network including a sensor-identification device, and a sensor locator on board of an aircraft for locating the sensor by the sensor-identification device in the earth-based sensor network, in accordance with embodiments of the present invention.

With reference now to FIGS. 2 and 3, and in particular to FIG. 1, in accordance with embodiments of the present invention, a perspective view 100 is shown in FIG. 1 relevant to the subsequent description of the geometrical arrangement of various components in embodiments of the present invention, described in the discussion of FIGS. 2 through 5. FIG. 1 shows the surface of the earth 180, as delineated by the horizon, and geographic locations of the following: a tract 110 covered by the earth-based sensor network 210; regions of interest, for example, regions of interest 130-1 and 130-2; sensors, of which sensor 210-1 located at geographic location 110-1 is an example, deployed over the surface of the earth 180 in the earth-based sensor network 210; and, a sensor locator, of which sensor locator 340 located at successive aerial locations 120-1 and 120-2 is an example, flown by an aircraft 330 over a vicinity 120 of the sensors in the tract 110 covered by the earth-based sensor network 210. As shown in FIG. 1, in accordance with an embodiment of the present invention, the tract 110 covered by in the earth-based sensor network 210 includes an arrangement of a plurality of geographic locations of sensors, indicated by an "X" at each geographic location of a sensor, for example, geographic location 110-1 of sensor 210-1, with respect to the surface of the earth 180. By way of example, the array of sensors in the tract 110 appears to be arranged in a grid pattern, without limitation thereto; but, other geometrical arrangements for the deployment of sensors within the tract 110 covered by the earth-based sensor network 210 are within the spirit and scope of embodiments of the present invention. For example, even though the array of sensors in the tract 110 appears to be arranged in a regular geometrical pattern, for example, the grid pattern shown in FIG. 1, a plurality of sensors arranged in an irregular array is also within the spirit and scope of embodiments of the present invention. For sensors arrayed on a square-grid, similar to the deployment of sensors in the tract 110 shown in FIG. 1, the dimensions of the earth-based sensor network may be about 10 kilometers (km) on each side, with about one million, $1 \times 10^6$, sensors arranged in a square-grid pattern; in such a pattern, the sensors may be spaced about every 10 meters (m) from the next adjacent sensor in two orthogonal directions. Embodiments of the present invention are directed towards a rapid and accurate means for both locating sensors in the tract covered by the earth-based sensor network and subsequent monitoring of sensors in the earth-based sensor network, such as, for example, earth-based sensor network 210 covering tract 110. Embodiments of the present invention also provide an alternative to other techniques of sensor location and monitoring know in the art, such as, for example, the use of sensor locator towers to locate the sensors, which involves considerable overhead in erecting a tower, and the use of trucks dragging lines of sensors onto a region of interest to deploy the sensors, which is subject to uncertainties in sensor geographic location on rough terrains. In contrast with the use of trucks dragging lines of sensors onto a region of interest, embodiments of the present invention provide for locating the sensors with an accuracy of better than 10 centimeters (cm), or, in other words, with an uncertainty of geographic location of less than about 10 cm. Embodiments of the present invention also refer to an "earth-based" sensor network 210, because sensors may be deployed on various types of tracts on the surface of the earth, without limitation to terrestrial terrains.

With further reference to FIGS. 1-5 and in particular to FIG. 1, in accordance with another embodiment of the present invention, vicinity 120, over which the sensor locator 340 on board of aircraft 330 is flown, includes a plurality of aerial locations, of which aerial location 120-1 is an example, indicated by a "Z." Also shown in FIG. 1, in accordance with an embodiment of the present invention, another aerial location, for example, aerial location 120-2, associated with the flight plan of the aircraft 330, at which the sensor locator 340 may also be positioned to acquire geographic-location data of the sensors, may be included in vicinity 120, over which the sensor locator 340 on board of aircraft 330 is flown. In accordance with an embodiment of the present invention, the earth-based sensor network 210 covering the tract 110 may, in turn, be covered by a plurality 130 of regions of interest, of which regions of interest 130-1 and 130-2 are examples; each region of interest may be associated with a respective aerial location of the sensor locator 340 as the sensor locator 340 is flown over the vicinity 120 of the sensors in the tract 110 covered by the earth-based sensor network 210. A region of interest, for example, region of interest 130-1, may include one or more sensor locations, of which geographic location 110-1 is an example. The regions of interest may be contiguous to one another, or alternatively, as shown in FIG. 1, may overlap to some degree. The overlap of regions of interest may serve to facilitate determining the geographic location of sensors in the tract 110 covered by the earth-based sensor network 210, as is subsequently described in the discussion of FIG. 3.

With reference now to FIG. 2 and further reference to FIG. 1, in accordance with embodiments of the present invention, a perspective view 200 is shown of the earth-based sensor network 210 in a sensor-network-monitoring system 301 (see FIG. 3). In accordance with embodiments of the present invention, the earth-based sensor network 210 includes at least one sensor, for example, sensor 210-1, of a plurality of sensors deployed on a tract 110 covered by an earth-based sensor network 210 on the surface of the earth 180. As shown in FIG. 2, by way of example, the earth-based sensor network 210 includes a plurality of sensors, each of which is indicated by a letter "S", a plurality of which are located at the plurality of geographic locations of sensors, each geographic location of which is indicated by an "X" in FIG. 1, without limitation thereto. In one embodiment of the present invention, the sensor 210-1 is configured to transmit a signal to a sensor-network computer 280. By way of example, a signal may be transmitted through a plurality 230 of super-nodes, of which super-node 230-1 is an example, in the earth-based sensor network 210 in response to the occurrence of an event 290, indicated by the letter "E." By way of example, in one embodiment of the present invention, a signal sent from a sensor, for example, sensor 210-1, may be sent by a hard-wired connection, for example, wire 220-1, to the super-node 230-1, without limitation thereto. By way of further example, a plurality of sensors, for example, the row of sensors including sensor 210-1, may be coupled through a plurality 220 of wires, of which wire 220-1 is an example, to a super-node, for example, super-node 230-1; the plurality 220 of wires may be bundled together coupled to a line of sensors, as in the row of sensors shown in FIG. 2 with the super-node 230-1 at the head of the line, without limitation thereto. In other embodiments of the present invention, the sensors may be arranged in configurations other than that shown in FIG. 2; and moreover, the sensors may be arranged in a wireless sensor network (WSN) communicating wirelessly with the sensor-network computer 280 directly. Also, within the spirit and scope of embodiments of the present invention, the sensors may be arranged in a WSN communicating wirelessly with a super-node, for example, super-node 230-1, which may be coupled with a hard-wired connection, for example, wire 240-1, with the sensor-network computer 280, without limitation thereto. Thus, within the spirit and scope of embodiments of the present invention, the plurality 230 of super-nodes, of which super-node 230-1 is an example, may be coupled to the sensor-network computer 280 through a plurality 240 of wires, of which wire 240-1 is an example; such a hard-wired connection may be provided by a co-axial cable, which provides high bandwidth for communications between the sensor-network computer 280 and each sensor of a plurality of sensors coupled to a super-node. Thus, a hybrid of wireless and hard-wired communication links in the earth-based sensor network 210 is within the spirit and scope of embodiments of the present invention. Moreover, such a hybrid of wireless and hard-wired communication links in the earth-based sensor network 210 may provide high speed performance at less cost than either a purely wireless, or purely hard-wired, earth-based sensor network.

With further reference to FIGS. 1 and 2, in accordance with embodiments of the present invention, as mentioned above, the earth-based sensor network 210 in the sensor-network-monitoring system 301 (see FIG. 3) is responsive to effects resulting from the occurrence of the event 290. To properly monitor the effects of such events, the sensors in the earth-based sensor network 210 are synchronized. In turn, synchronization of sensors in the earth-based sensor network 210 utilizes geographic-location data for each of the sensors in the earth-based sensor network 210. Moreover, accurate analysis of the signals transmitted from the sensors may further depend on the determination of values of signal propagation delays from each of the sensors in the earth-based sensor network 210, which also may utilize geographic-location data for each of the sensors in the earth-based sensor network 210. Therefore, embodiments of the present invention provide a sensor-location system for locating sensors in the tract 110 covered by an earth-based sensor network 210, as is next described.

With reference now to FIG. 3 and further reference to FIGS. 1 and 2, in accordance with embodiments of the present invention, a perspective view 300 is shown of a sensor-network-monitoring system 301 including the earth-based sensor network 210 of FIG. 2, and a sensor-location system 302 for locating sensors in the tract 110 of FIG. 1 covered by the earth-based sensor network 210. As previously described in FIG. 2, the earth-based sensor network 210 includes at least one sensor, for example, sensor 210-1, of a plurality of sensors deployed on the tract 110 covered by the earth-based sensor network 210; the sensor 210-1 is configured to transmit a signal to a sensor-network computer 280. As previously described in the discussion of FIG. 2, the earth-based sensor network 210 of the sensor-network-monitoring system 301 is configured to provide information about the effects of the event 290 on sensors in the plurality of sensors, of which sensor 210-1 is an example, through transmission, for example, along any of the plurality 220 of wires shown in FIG. 2, of a signal associated with the event 290. For example, through the effects of the event 290 on at least one sensor 210-1 in the earth-based sensor network 210, the signal may provide data about: the event 290, itself; and/or, the effects of the event 290 on the earth. By way of example, in one embodiment of the present invention, the event 290 may be the artificially produced vibration of a seismic vibrator, for example, a controlled explosive detonation, or alternatively, a seismic pulse, as might be produced by dropping a monitoring vehicle onto the ground, used to induce vibrations in the earth for reflection seismography, as is used in petroleum exploration. On the other hand, in another embodiment of the present invention, the event 290 might be of natural origin, such as, an earthquake. Thus, in accordance with embodiments of the present invention, the signal transmitted from the sensor 210-1 includes geophysical data, which may be derived from an accelerometer, a geophone, or alternatively, a seismometer, or other geophysical sensor.

With further reference to FIGS. 1, 2 and 3, in accordance with embodiments of the present invention, the sensor-network-monitoring system 301 provides a central nervous system for the earth (CeNSE) that can provide a variety of data from the surface of the earth 180. In accordance with embodiments of the present invention, sensors, of which sensor 210-1 is an example, in the earth-based sensor network 210 are readily deployable, as well as redeployable. In accordance one embodiment of the present invention, a deployer of a sensor 210-1 of a WSN may be a person who deploys the sensors of the earth-based sensor network 210 in similar fashion to the manner in which a farm laborer plants seedlings, without limitation thereto, as other types of deployers are also within the spirit and scope of embodiments of the present invention. Thus, in one embodiment of the present invention, after a region of interest on the surface of the earth has been monitored, the entire earth-based sensor network 210 may be picked up and redeployed to another region of interest on the surface of the earth 180. The above described mode of operation is expected to be especially useful in mineralogical prospecting operations, such as, petroleum exploration. Therefore, in accordance with embodiments of the present invention, a means is provided for acquiring geographic-location data of the sensors, of which sensor 210-1 is an example, in the earth-based sensor network 210, which is next described.

With further reference to FIGS. 1, 2 and 3, embodiments of the present invention for the sensor-location system 302 next described may be incorporated within the environment of the sensor-network-monitoring system 301 of FIG. 3. In accordance with embodiments of the present invention, the sensor-location system 302 includes at least one sensor-identification device (SID) 310-1, and at least one sensor locator 340, indicated by the letters "SL". In accordance with embodiments of the present invention, the sensor-identification device 310-1 is affixed to a respective sensor 210-1 in the earth-based sensor network 210. Thus, as shown in FIG. 3, a plurality 310 of sensor-identification devices (SIDs) is associated with the plurality of sensors in the earth-based sensor network 210 in a one-to-one relationship, such that each sensor designated with the letter "S" in FIG. 2 is shown as having a dedicated sensor-identification device, designated by the letters "SID" in FIG. 3. In accordance with embodiments of the present invention, the sensor locator 340 is configured for use from on board of an aircraft 330. Moreover, in accordance with embodiments of the present invention, the sensor locator 340 is configured to acquire geographic-location data of the sensor 210-1 including an identifying signature from the sensor-identification device 310-1 of the sensor 210-1 in the tract 110 covered by the earth-based sensor network 210.

With further reference to FIGS. 2 and 3, in accordance with embodiments of the present invention, the sensor-identification device 310-1 of the sensor 210-1 may include a passive sensor-identification device selected from the group consisting of a flag, a distinctive mark, an identifying coating, and a bar code, without limitation thereto. Alternatively, in accordance with embodiments of the present invention, the sensor-identification device 310-1 of the sensor 210-1 may include an active sensor-identification device selected from the group consisting of a beacon, a light-emitting diode, a light-detection-and-ranging (LIDAR) reflector, a laser, and a radio transponder, without limitation thereto. In another embodiment of the present invention, the sensor locator 340 may include a device selected from the group consisting of a camera, a LIDAR system, a radio antenna, and combinations of the camera, the LIDAR system, and the radio antenna, without limitation thereto. In an embodiment of the present invention that utilizes a camera on board of the aircraft 330 as the sensor locator 340, the geographic-location data of the sensor 210-1 includes an aerial photographic montage, which is next described.

With further reference to FIGS. 1, 2 and 3, in accordance with embodiments of the present invention, the aerial photographic montage includes a plurality 130 of aerial images of regions of interest, of which regions of interest 130-1 and 130-2 are examples; the regions of interest lie in the tract 110 containing at least one sensor, for example, sensor 210-1 in region of interest 130-1, in the earth-based sensor network 210. Thus, in one embodiment of the present invention, a plurality 130 of regions of interest may be associated with a plurality of aerial images of the regions of interest in a one-to-one relationship, such that each region of interest shown in FIG. 1 is associated with an aerial image of the region of interest in the aerial photographic montage. In this way, the tract 110 is blanketed with the plurality of aerial images of the regions of interest such that geographic-location data of a plurality of sensors in the earth-based sensor network 210 may be provided. In an embodiment of the present invention, a geographic location 110-1 of the sensor 210-1 in the tract 110 is designated by an identifying signature of a respective sensor-identification device 310-1 of the sensor 210-1 appearing in at least one of the aerial images of the aerial photographic montage. Similarly, for a plurality of sensors in the earth-based sensor network 210, geographic locations of the sensors, of which geographic location 110-1 of sensor 210-1 is an example, in the tract 110 may also be designated by identifying signatures of respective sensor-identification devices, of which sensor-identification device 310-1 is an example, of the sensors appearing in a plurality of aerial images of the aerial photographic montage. Thus, in accordance with embodiments of the present invention, the camera is configured to acquire the plurality of aerial images of regions of interest in the tract 110 covered by the earth-based sensor network 210. In one embodiment of the present invention, an x-co-ordinate and a y-co-ordinate of a sensor may be determined from the geographic location of the sensor designated by the identifying signature of a respective sensor-identification device of the sensor appearing in an aerial image of the aerial photographic montage, which is subsequently described.

With further reference to FIGS. 1, 2 and 3, in accordance with embodiments of the present invention, the sensor-location system 302 may also include the aircraft 330; the aircraft 330 is configured to fly the sensor locator 340 over a vicinity of the sensors in the tract 110 covered by the earth-based sensor network 210. In accordance with embodiments of the present invention, the aircraft 330 provides for ease of mobility of the sensor locator 340 in contrast with other sensor locator support structures, such as towers, or trucks with erectable towers, which may involve tedious assembly and disassembly procedures. In one embodiment of the present invention, the aircraft 330 may be configured as a remotely controlled drone. In another embodiment of the present invention, the sensor-location system 302 may also include a payload 350, indicated by the letter "P," on board of the aircraft 330; the payload 350 may be selected from the group consisting of: a global-positioning-system receiver; a transmitter for sending geographic-location data (shown by a heavy double headed arrow in FIG. 3) of the sensor 210-1 from the aircraft 330; a receiver for receiving command signals (also, indicated by the heavy double headed arrow in FIG. 3) sent to the aircraft 330; an on-board computer for processing the signals and the geographic-location data of the sensor 210-1; an on-board data-storage device configured to store geographic-location data of the sensor 210-1; and combinations of the global-positioning-system receiver, the transmitter, the receiver, the on-board computer, and on-board data-storage device, without limitation thereto. In another embodiment of the present invention, the global-positioning-system receiver may be configured to provide aerial location data on the aerial location 120-1 of the sensor locator 340 on board of the aircraft 330 when the geographic-location data of the sensor 210-1 is acquired.

By way of example, with further reference to FIGS. 1, 2 and 3, in accordance with embodiments of the present invention, the aerial location, for example, aerial location 120-1, of the sensor locator 340 on board of the aircraft 330 may be used to determine the geographic location 110-1 of the sensor 210-1 on the surface of the earth 180 from the identifying signature from the sensor-identification device 310-1 of the sensor 210-1 received by the sensor locator 340, without limitation thereto. For example, in one embodiment of the present invention, the x-co-ordinate and the y-co-ordinate of a sensor 210-1 may be determined from the geographic location of the sensor designated by the identifying signature of a respective sensor-identification device 310-1 of the sensor 210-1 appearing in an aerial image of the aerial photographic montage by self-consistently referencing the plurality of aerial images in the aerial photographic montage to one another, if the geographic location of a sensor in at least one aerial image is accurately known. The geographic location of a sensor in at least one aerial image may be pre-determined by standard surveying techniques, or alternatively, other means known in the art. However, in accordance with one embodiment of the present invention, to determine the x-co-ordinates and the y-co-ordinates of other sensors appearing in the aerial images of the aerial photographic montage accurate aerial location data for the aerial location of the sensor locator is provided for each of the aerial images, which allows for accurate registry of one aerial image with another aerial image. Moreover, as shown in FIG. 3, the perspective with which an aerial image is acquired can affect the appearance of the image so that stable flight of the aircraft and accurate recordation and control of the orientation of camera relative to the region of interest are provided, in accordance with embodiments of the present invention. Moreover, in another embodiment of the present invention, the sensor-location system 302 may also include an altimeter configured to provide vertical-location data of the sensor locator 340 on board of the aircraft 330 when the geographic-location data of the sensor 210-1 is acquired; and a LIDAR system configured to provide vertical-location data of the sensor 210-1 with respect to the sensor locator 340 on board of the aircraft 330 when the geographic-location data of the sensor 210-1 is acquired. Thus, in accordance with embodiments of the present invention, variations in the spacing between the identifying signatures of respective sensor-identification devices appearing in an aerial image of the aerial photographic montage due to variations in altitude of the aircraft 330 can be taken into account when calculating the x-co-ordinate, the y-co-ordinate, as well as the z-co-ordinate of a sensor, for example, sensor 210-1.

With further reference to FIGS. 1, 2 and 3, in accordance with embodiments of the present invention, the sensor-location system 302 may also include a data-location receiving station selected from the group consisting of a ground-based computer 380 configured to receive geographic-location data sent (shown by the heavy double headed arrow in FIG. 3) from the on-board data-storage device during flight of the aircraft 330 in real-time, and a ground-based computer 380 configured to receive geographic-location data dumped from the on-board data-storage device upon coupling with the on-board data-storage device after the aircraft 330 returns to a launching station. In one embodiment of the present invention, the sensor-network computer 280 may include the ground-based computer 380, without limitation thereto. In another embodiment of the present invention, the ground-based computer 380 may transmit (shown by the heavy double headed arrow in FIG. 3) flight control data, as well as instructions to the on-board computer for the control of the camera in taking aerial images.

Figure 4A:
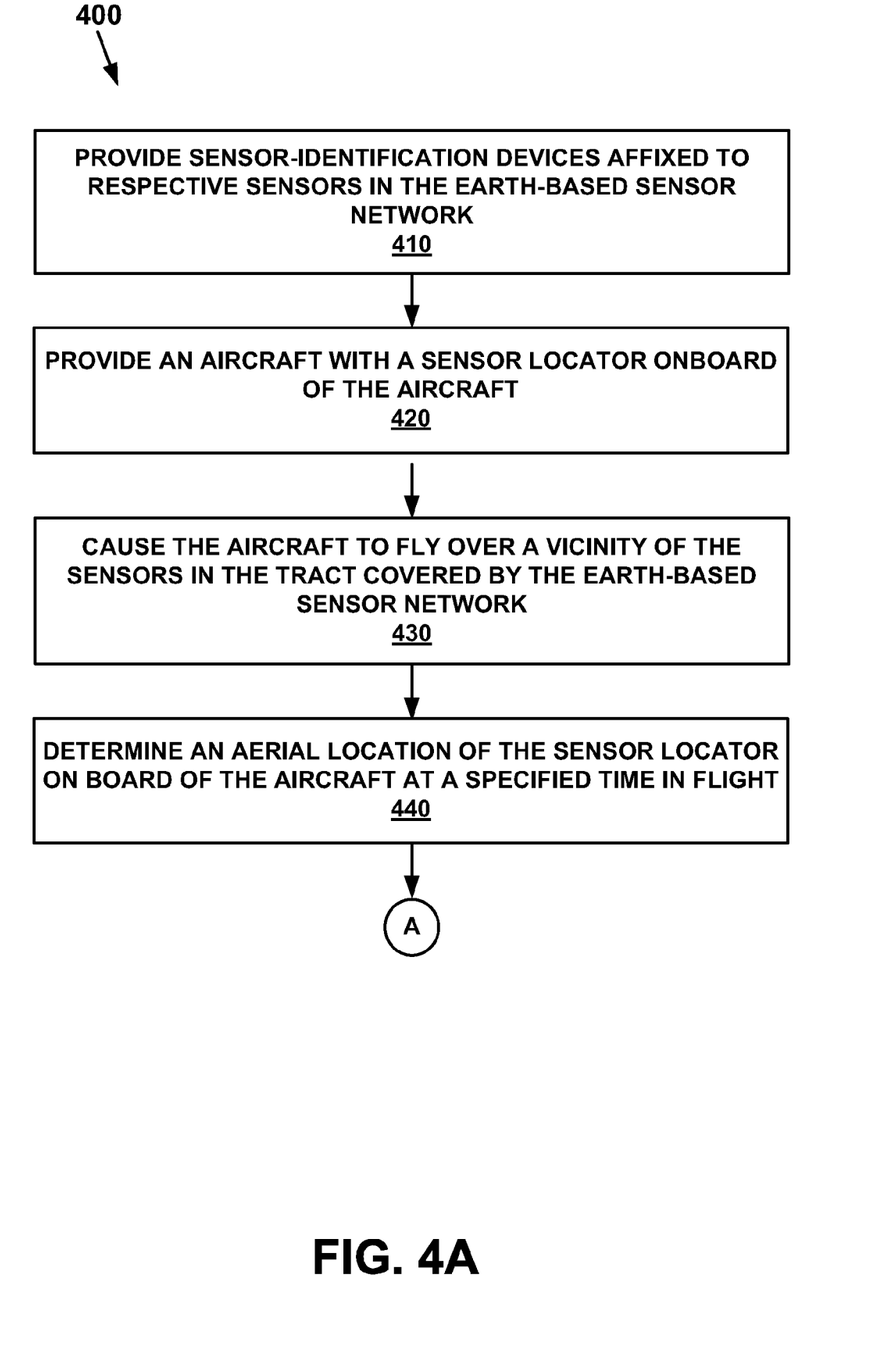
FIGS. 4A and 4B are a flowchart of a method for locating sensors in a tract covered by an earth-based sensor network, in accordance with embodiments of the present invention.
Figure 4B:
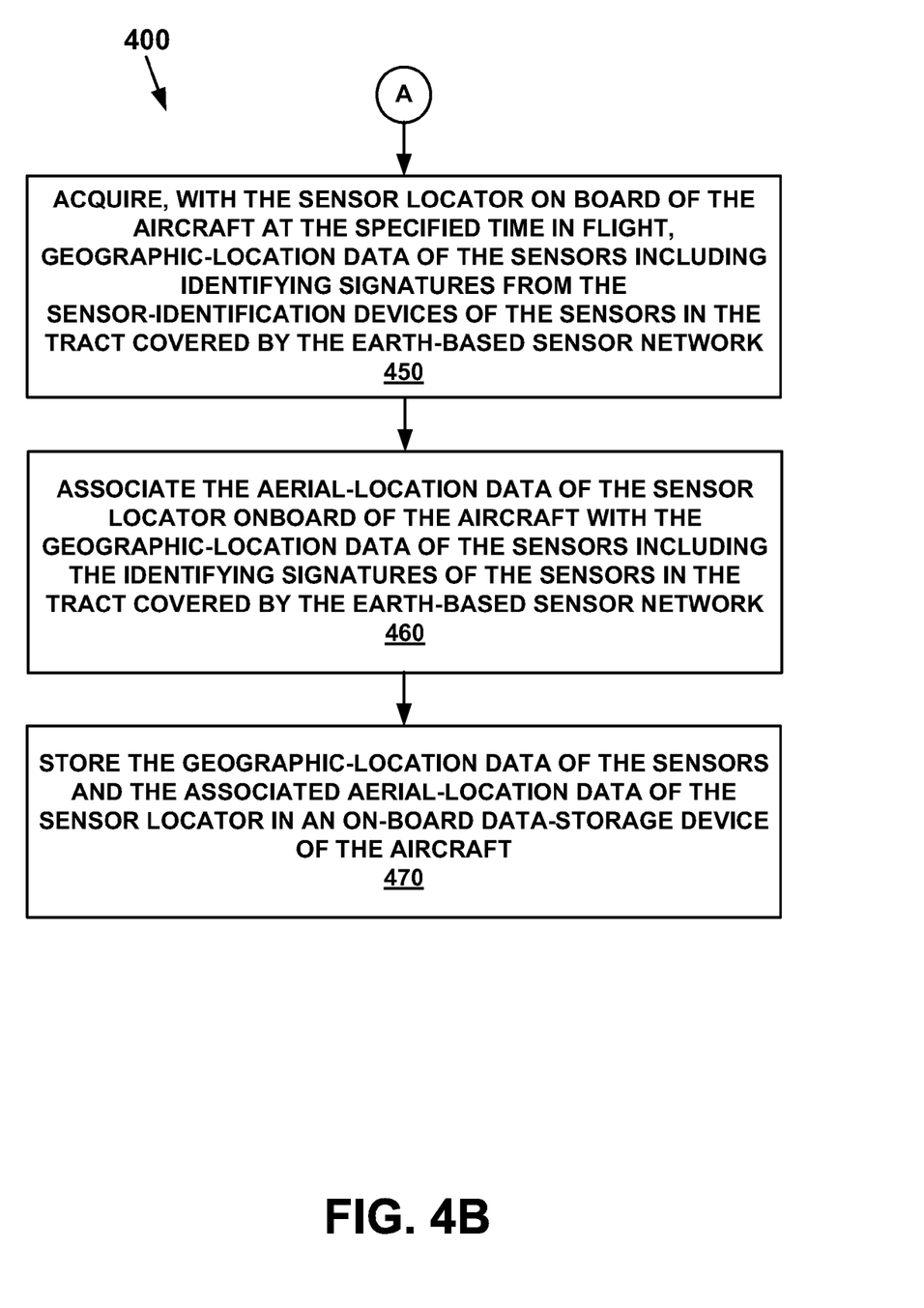

With reference now to FIGS. 4A and 4B, in accordance with yet other embodiments of the present invention, a flowchart 400 is shown of a method for locating sensors in a tract covered by an earth-based sensor network. The method for deploying a sensor-network-monitoring system includes the following. At 410, sensor-identification devices affixed to respective sensors are provided in the earth-based sensor network. At 420, an aircraft is provided with a sensor locator on board of the aircraft. At 430, the aircraft is caused to fly over a vicinity of the sensors in the tract covered by the earth-based sensor network. At 440, an aerial location of a sensor locator on board of the aircraft is determined at a specified time in flight. At 450, geographic-location data is acquired, with the sensor locator on board of the aircraft at the specified time in flight, of the sensors including identifying signatures from the sensor-identification devices of the sensors in the tract covered by the earth-based sensor network. At 460, aerial-location data of the sensor locator on board of the aircraft is associated with the geographic-location data of the sensors including the identifying signatures of the sensors in the tract covered by the earth-based sensor network. At 470, the geographic-location data of the sensors associated with the aerial-location data of the sensor locator on board of the aircraft is stored in an on-board data-storage device of the aircraft.

Figure 5:
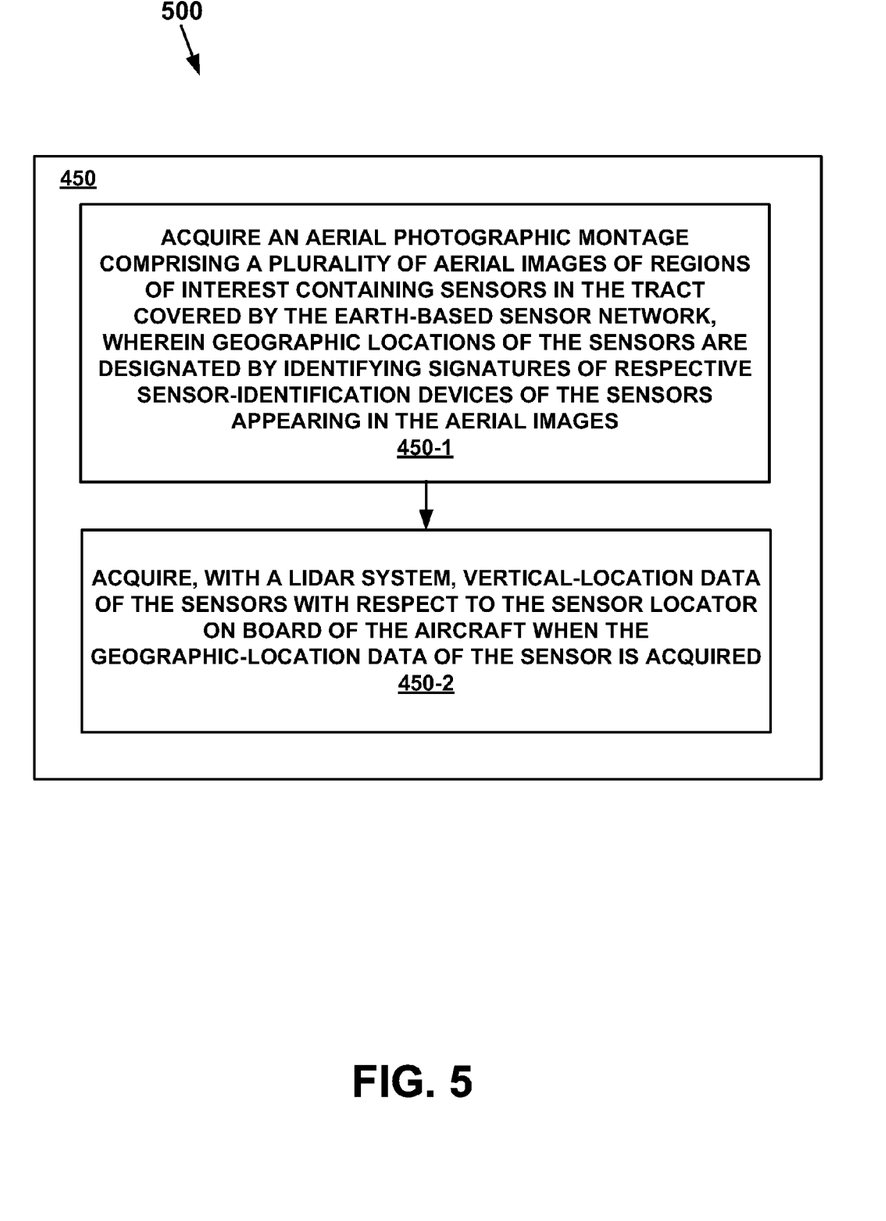
FIG. 5 is a flowchart detailing an operation for acquiring geographic-location data of the sensors in the method for locating the sensors in the tract covered by the earth-based sensor network, in accordance with embodiments of the present invention.

With reference now to FIG. 5, in accordance another embodiment of the present invention, a flowchart 500 is shown that details the operation 450 for acquiring geographic-location data of the sensors in the method for locating the sensors described above. At 450-1, an aerial photographic montage is acquired; the aerial photographic montage includes a plurality of aerial images of regions of interest containing sensors in the tract covered by the earth-based sensor network, such that geographic locations of the sensors are designated by identifying signatures of respective sensor-identification devices of the sensors appearing in the aerial images. At 450-2, vertical-location data of the sensors with respect to the sensor locator on board of the aircraft is acquired, with a LIDAR system, when the geographic-location data of the sensor is acquired.

By way of example, in the foregoing descriptions of specific embodiments of the present invention, the x-co-ordinate, y-co-ordinate, and z-co-ordinate of a sensor has been referred to; alternatively, the conversion of these co-ordinates of the sensor into latitude, longitude, and elevation above sea-level is also within the spirit and scope of embodiments of the present invention. Moreover, the determination of the geographic location of a sensor in other arbitrary co-ordinates, which may be convenient, is also within the spirit and scope of embodiments of the present invention.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It may be intended that the scope of the invention be defined by the claims appended hereto and their equivalents.

What is claimed is:

1. A sensor-location system for locating sensors in a tract covered by an earth-based sensor network, said sensor-location system comprising:
    at least one sensor-identification device, said sensor-identification device affixed to a respective sensor in said earth-based sensor network; and
    at least one sensor locator, said sensor locator configured for use from on board of an aircraft, and configured to acquire geographic-location data of said sensor including an identifying signature from said sensor-identification device of said sensor in said tract covered by said earth-based sensor network, wherein said sensor locator configured for use from on board of an aircraft further comprises:
        an altimeter configured to provide vertical-location data of said sensor locator configured for use from on board of an aircraft when said geographic-location data of said sensor is acquired; and
        a light-detection-and-ranging (LIDAR) system configured to provide vertical-location data of said sensor with respect to said sensor locator configured for use from on board of an aircraft when said geographic-location data of said sensor is acquired.

2. The sensor-location system of claim 1, wherein said sensor-identification device of said sensor comprises a passive sensor-identification device selected from a group consisting of a flag, a distinctive mark, an identifying coating, and a bar code.

3. The sensor-location system of claim 1, wherein said sensor-identification device of said sensor comprises an active sensor-identification device selected from a group consisting of a beacon, a light-emitting diode, said light-detection-and-ranging (LIDAR) reflector, a laser, and a radio transponder.

4. The sensor-location system of claim 1, wherein said sensor locator comprises a device selected from a group consisting of a camera, said light-detection-and-ranging (LIDAR) system, a radio antenna, and combinations thereof.

5. The sensor-location system of claim 4, wherein said geographic-location data of said sensor comprises an aerial photographic montage comprising:
    a plurality of aerial images of regions of interest in said tract containing at least one sensor in said earth-based sensor network;
    wherein a geographic location of said sensor in said tract is designated by an identifying signature of a respective sensor-identification device of said sensor appearing in at least one of said aerial images of said aerial photographic montage; and
    wherein said camera is configured to acquire said plurality of aerial images of regions of interest in said tract covered by said earth-based sensor network.

6. The sensor-location system of claim 1, wherein said aircraft comprises a remotely controlled drone.

7. The sensor-location system of claim 1, further comprising:
    a payload on board of said aircraft selected from the group consisting of a global-positioning-system receiver, a transmitter for sending geographic-location data of said sensor from said aircraft, a receiver for receiving command signals sent to said aircraft, an on-board computer for processing said signals and said geographic-location data of said sensor, an on-board data-storage device configured to store geographic-location data of said sensor, and combinations thereof.

8. The sensor-location system of claim 7, wherein said global-positioning-system receiver is configured to provide an aerial-location data of said sensor locator on board of said aircraft when said geographic-location data of said sensor is acquired.

9. The sensor-location system of claim 7, further comprising:
    a data-location receiving station selected from a group consisting of a ground-based computer configured to receive geographic-location data sent from said on-board data-storage device during flight of said aircraft in real-time, and a ground-based computer configured to receive geographic-location data dumped from said on-board data-storage device upon coupling with said on-board data-storage device after said aircraft returns to a launching station.

10. A sensor-network-monitoring system, comprising:
an earth-based sensor network, said network comprising:
at least one sensor of a plurality of sensors deployed on a tract covered by said earth-based sensor network, said sensor configured to transmit a signal to a sensor-network computer; and
a sensor-location system for locating sensors in said tract covered by said earth-based sensor network, said sensor-location system comprising:
at least one sensor-identification device, said sensor-identification device affixed to said sensor in said earth-based sensor network; and
at least one sensor locator, said sensor locator configured for use from on board of an aircraft, and configured to acquire geographic-location data of said sensor including an identifying signature from said sensor-identification device of said sensor in said tract covered by said earth-based sensor network, wherein said sensor locator configured for use from on board of an aircraft further comprises:
an altimeter configured to provide vertical-location data of said sensor locator configured for use from on board of an aircraft when said geographic-location data of said sensor is acquired; and
a light-detection-and-ranging (LIDAR) system configured to provide vertical-location data of said sensor with respect to said sensor locator configured for use from on board of an aircraft when said geographic-location data of said sensor is acquired.

11. The sensor-network-monitoring system of claim 10, wherein said sensor comprises a device selected from a group consisting of an accelerometer, a geophone, and a seismometer; and
wherein said signal transmitted from said sensor to said sensor-network computer comprises geophysical data.

12. A method for locating sensors in a tract covered by an earth-based sensor network, said method comprising:
providing sensor-identification devices affixed to respective sensors in said earth-based sensor network;
providing an aircraft with a sensor locator on board of said aircraft;
causing said aircraft to fly over a vicinity of said sensors in said tract covered by said earth-based sensor network;
determining an aerial location of said sensor locator on board of said aircraft at a specified time in flight;
acquiring, with said sensor locator on board of said aircraft at said specified time in flight, geographic-location data of said sensors including identifying signatures from said sensor-identification devices of said sensors in said tract covered by said earth-based sensor network, wherein said acquiring said geographic-location data of said sensors comprises:
acquiring an aerial photographic montage comprising:
a plurality of aerial images of regions of interest containing sensors in said tract covered by said earth-based sensor network;
wherein geographic locations of said sensors are designated by identifying signatures of respective sensor-identification devices of said sensors appearing in said aerial images; and
acquiring, with a light-detection-and-ranging (LIDAR) system, vertical-location data of said sensors with respect to said sensor locator on board of said aircraft when said geographic-location data of said sensor is acquired;
associating aerial-location data of said sensor locator on board of said aircraft with said geographic-location data of said sensors including said identifying signatures of said sensors in said tract covered by said earth-based sensor network;
storing said geographic-location data of said sensors and associated aerial-location data of said sensor locator in an on-board data-storage device of said aircraft.

* * * * *